(12) United States Patent
Templeman et al.

(10) Patent No.: US 11,171,379 B2
(45) Date of Patent: Nov. 9, 2021

(54) BATTERY WITH INTEGRATED SHOCK AND VIBRATION PROTECTION FEATURES

(71) Applicant: SAVIOR PRODUCTS, INC., Lenexa, KS (US)

(72) Inventors: Jon Clayton Templeman, Overland Park, KS (US); Brock Christian Templeman, Overland Park, KS (US)

(73) Assignee: Savior Products, Inc., Lenexa, KS (US)

( * ) Notice: Subject to any disclaimer, the term of this patent is extended or adjusted under 35 U.S.C. 154(b) by 252 days.

(21) Appl. No.: 16/408,519

(22) Filed: May 10, 2019

(65) Prior Publication Data

US 2019/0348651 A1  Nov. 14, 2019

Related U.S. Application Data

(60) Provisional application No. 62/670,194, filed on May 11, 2018.

(51) Int. Cl.
| | |
|---|---|
| *H01M 50/00* | (2021.01) |
| *H01M 50/20* | (2021.01) |
| *B60R 16/04* | (2006.01) |

(52) U.S. Cl.
CPC ............. *H01M 50/20* (2021.01); *B60R 16/04* (2013.01); *H01M 2220/20* (2013.01)

(58) Field of Classification Search
CPC ............................... H01M 50/20; B60R 16/04
See application file for complete search history.

(56) References Cited

U.S. PATENT DOCUMENTS

| | | | |
|---|---|---|---|
| 4,476,200 A | 10/1984 | Markin et al. | |
| 8,603,666 B2 | 12/2013 | Nagamine et al. | |
| 9,276,243 B2 * | 3/2016 | Templeman | ............ B63B 17/00 |
| 9,543,558 B2 * | 1/2017 | Templeman | ............ B60R 16/04 |
| 9,899,648 B2 * | 2/2018 | Templeman | .......... H01M 50/20 |
| 9,954,206 B2 * | 4/2018 | Templeman | .......... H01M 50/20 |
| 10,128,475 B2 * | 11/2018 | Templeman | .......... H01M 50/24 |
| 2012/0018238 A1 | 1/2012 | Mizoguchi et al. | |
| 2015/0044538 A1 * | 2/2015 | Katayama | ........... H01M 10/613 |
| | | | 429/120 |
| 2015/0188104 A1 * | 7/2015 | Templeman | .......... H01M 50/20 |
| | | | 429/100 |
| 2017/0054120 A1 * | 2/2017 | Templeman | .......... H01M 50/20 |

OTHER PUBLICATIONS

International Search Report and Written Opinion for PCT Appln. No. PCT/US2019/031671; Intl. Filing Date May 10, 2019; and all references cited therein.

* cited by examiner

*Primary Examiner* — Milton I Cano
*Assistant Examiner* — Mary G Henshaw
(74) *Attorney, Agent, or Firm* — Hovey Williams LLP

(57) ABSTRACT

A vehicle battery that includes a partially hollow battery shell, shock-absorbing material, and a mounting base. The battery shell has an upper section and a stepped-in lower section, the lower section having a sidewall and a floor. The shock-absorbing material is attached to the sidewall of the lower section of the battery shell and has a lower edge that extends below the floor of the lower section. The mounting base is attached to the lower edge of the shock-absorbing material and is spaced from the floor of the lower section of the battery shell to isolate the battery shell from a vehicle surface on which it is supported.

20 Claims, 3 Drawing Sheets

BATTERY WITH INTEGRATED SHOCK AND VIBRATION PROTECTION FEATURES

RELATED APPLICATION

This patent application claims priority benefit with regard to all common subject matter of earlier-filed U.S. Provisional Patent Application Ser. No. 62/670,194, filed on May 11, 2018, and entitled "BATTERY WITH INTEGRATED SHOCK AND VIBRATION PROTECTION FEATURES" and which is hereby incorporated by reference in its entirety into the present application.

BACKGROUND

1. Field

This invention relates generally to the field of batteries and battery cases and, in particular, to an improved battery with integrated shock and vibration protection features.

2. Discussion of Related Art

Cars, boats, motorcycles, and other vehicles typically include one or more batteries for storing and providing electrical power. These batteries can fail or prematurely degrade in performance due to excessive vibrations and shocks generated or transmitted by the vehicles and/or the vehicles' operating environments. This is especially true for batteries used in trucks, off-road vehicles, boats, personal watercraft, all-terrain vehicles, and other vehicles that operate in rough water or uneven terrain. All types of batteries, and particularly flooded lead-acid batteries, absorbent glass mat (AGM) batteries, gel cell batteries, spiral cell batteries, and lithium batteries, are expensive, difficult to replace, and difficult to safely dispose and recycle. Thus, avoiding premature battery failure and replacement is highly desired.

Most vehicles are equipped with battery boxes, battery trays or other original equipment battery hold down devices "OE battery holders" to secure their batteries. Such OE battery holders often don't absorb vibrations and shocks but instead transmit vibrations and shocks directly into batteries. Shock and/or vibration absorbing pads (shock pads) may be placed in these OE battery holders and under their batteries, but such shock pads do not secure the batteries to their vehicles. The batteries therefore must be strapped onto or otherwise secured to the vehicles while they are on the shock pads, but doing so eliminates much of the benefits of the shock pads because the straps or other securement mechanisms compress the shock pads and thus limit their effectiveness. Moreover, vibrations and shocks travel through the straps or other securement mechanisms into the batteries, thus negating or at least minimizing the shock pads' effectiveness.

Supplemental battery cases and other aftermarket battery hold-down and protection devices have also been developed to protect batteries, but they suffer from similar limitations. For example, many aftermarket battery hold-down and protection devices don't fit properly in their intended vehicles. Vehicle batteries are subject to stringent Battery Council International (BCI$^{SM}$) length, width, and height requirements as well as battery hold-down configurations and terminal configurations according to designated BCI$^{SM}$ Battery Group Sizes. These designated BCI$^{SM}$ Battery Group Sizes are then used by vehicle manufacturers and others to design OE battery holders to guarantee batteries will fit properly into their vehicles. Aftermarket battery hold-down and protection devices add additional length, width, and/or height which exceeds the BCI$^{SM}$ Battery Group Size requirements, creating fitment interference with the OE battery holders. Thus, aftermarket battery hold-down and protection devices often require vehicle modifications or battery relocation for installation, which consumers may not be capable of or comfortable with doing and which may void vehicle warranties and lower vehicle resale values. These BCI$^{SM}$ specifications therefore make it difficult to incorporate shock and vibration isolation elements found in some hold-down boxes, cases, trays, and aftermarket battery protection devices.

SUMMARY

Embodiments of the present invention solve the above-described problems and/or other problems of OE battery holders and aftermarket battery hold-down and protection devices by providing a vehicle battery with integrated shock and vibration protection features. The battery of the present invention has the same overall footprint and size as standard vehicle batteries and therefore meets all BCI$^{SM}$ Battery Group Size requirements and fits within an OE battery holder without modification; has nearly the same overall volume as standard vehicle batteries and therefore does not suffer significantly from volumetric capacity limitations; and is equipped with securement features that interact with the hold down structures in OE battery holders.

An embodiment of the battery comprises a battery shell; a flexible shock-absorbing pad; and a rigid mounting base.

The battery shell encloses battery plates and other conventional battery components. The lower walls of the battery shell are stepped-in to define an upper section and a slightly smaller lower section.

The shock-absorbing pad is formed of compressible material such as rubber and is integrally formed with or attached to the lower section of the battery shell. The lower edge of the pad extends below the floor of the battery shell, the importance of which is discussed below.

The rigid mounting base is attached to the lower edge of the shock-absorbing pad and forms the lowermost portion of the battery. The shock-absorbing pad spaces the battery shell from the mounting base so the battery shell is isolated from the mounting base and the vehicle surface on which it rests. The mounting base also includes integral hold-down structure for engaging corresponding hold-down structure in the OE battery holder.

Because the battery shell is isolated from the mounting base and hence the vehicle by the shock-absorbing pad, no direct mechanical pathway exists between the vehicle and the battery shell. Any shocks or vibrations that are transferred from the vehicle to the mounting base are at least partially mitigated by the shock absorbing pad.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
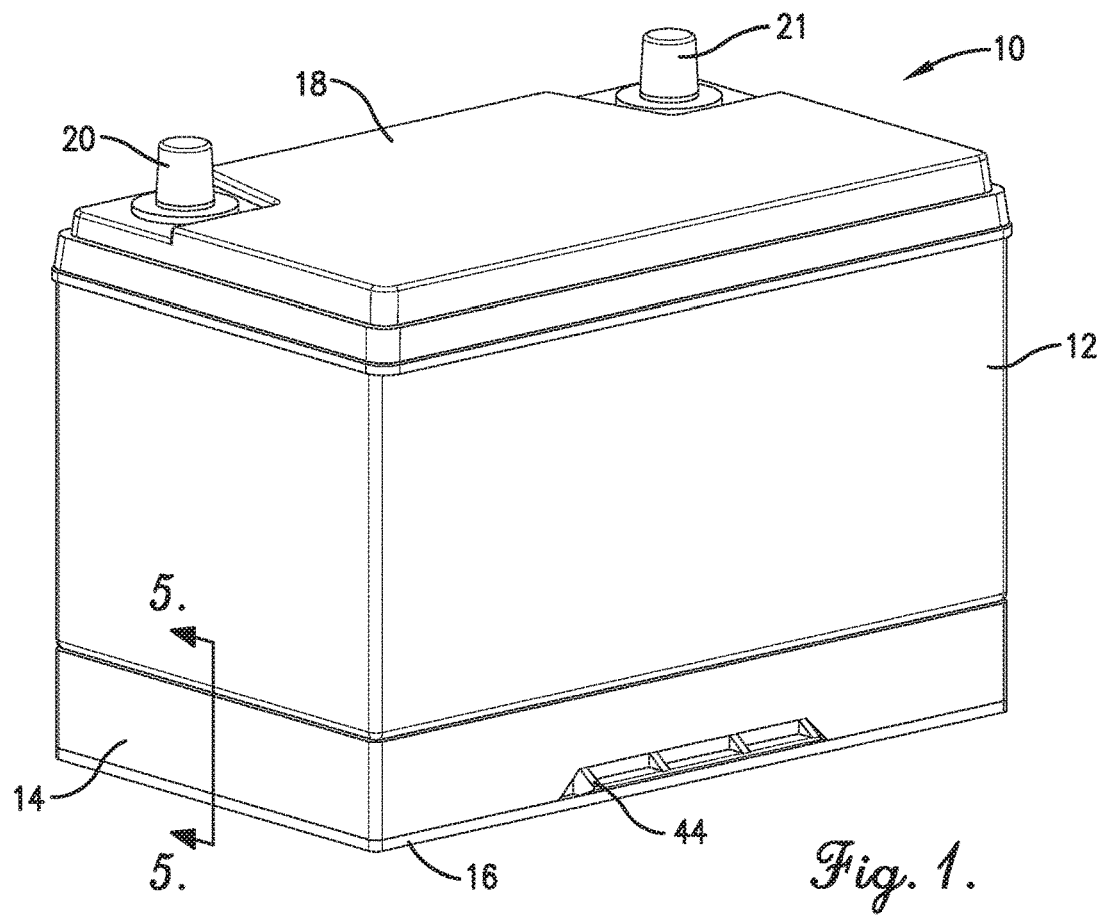
FIG. 1 is a top perspective view of a vehicle battery constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DESCRIPTION OF EMBODIMENTS OF INVENTION

The present invention provides a vehicle battery with integrated shock and vibration protection features. The battery has the same overall footprint and size as standard vehicle batteries and therefore meets all BCI$^{SM}$ Battery Group Size requirements and fits within an OE battery holder without modification; has nearly the same overall volume as standard vehicle batteries and therefore does not suffer significantly from volumetric capacity limitations; and is equipped with securement features that interact with the hold down structures in OE battery holders.

With the present invention, an OE vehicle manufacturer or vehicle owner can simply place the battery in an OE battery holder which utilizes the battery's hold down structures for securement and obtain all the shock and vibration protection benefits of an aftermarket battery hold-down and protection device without any of the associated fitment problems or significant reduction in volumetric capacity. As shown in the drawing figures and as described below, the integrated shock and vibration features are prominently visible on the exterior of the battery and therefore provide a visual indication of the shock and vibration features of the battery, thus providing a valuable incentive to buy and install the battery.

Figure 2:
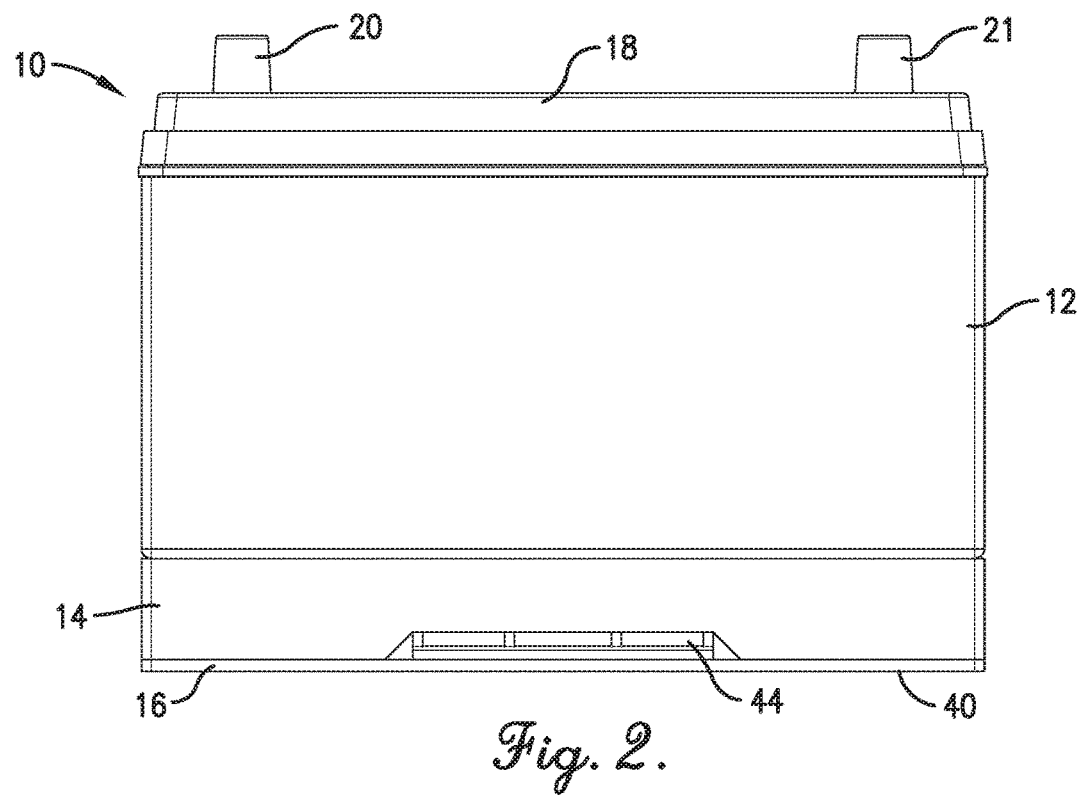
FIG. 2 is a side view of the vehicle battery.

Specific embodiments of the invention will now be described with reference to the attached drawings figures. As best shown in FIGS. 1 and 2, a battery 10 constructed in accordance with embodiments of the invention broadly comprises a battery shell 12; a flexible shock-absorbing pad 14; and a rigid mounting base 16.

Figure 4:
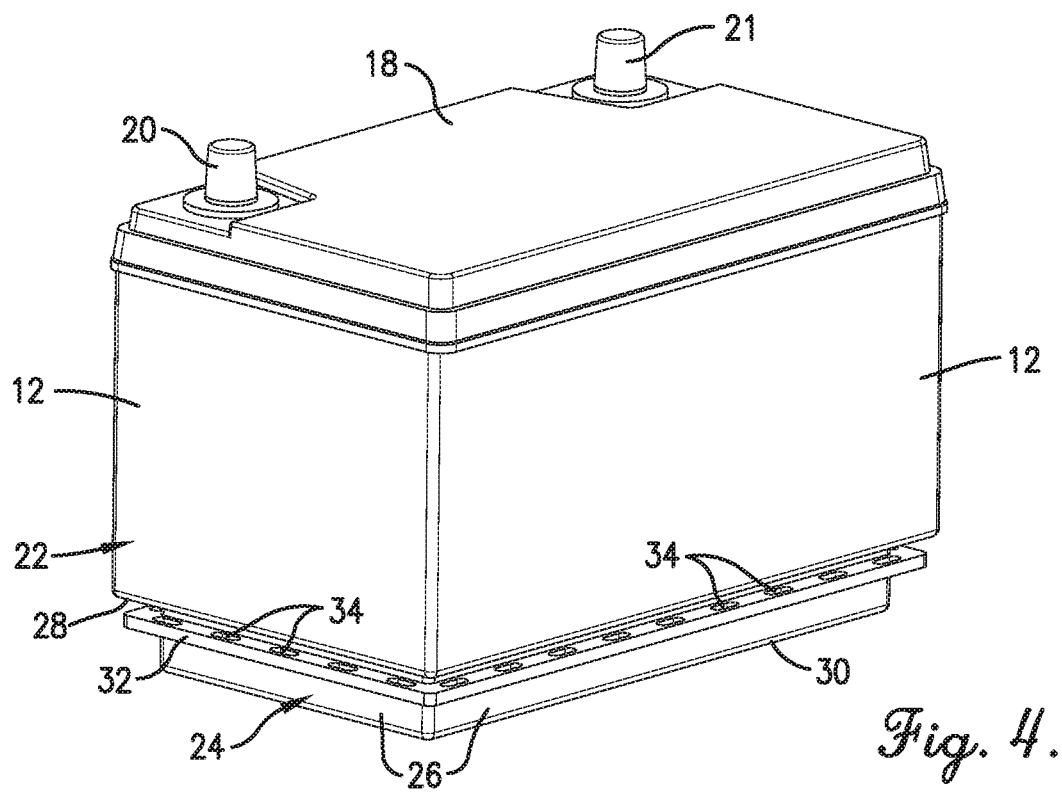
FIG. 4 is a top perspective view of the vehicle battery with its shock-absorbing pad and mounting base removed.

The battery shell 12 is shown without the shock-absorbing pad 14 and the mounting base 16 in FIG. 4. The battery shell 12 is at least partially hollow and encloses a number of conventional battery plates and/or other components found in batteries. As shown in FIG. 1, the battery shell 12 has a cover 18 and positive and negative terminals 20, 21 extending through the cover and electrically connected to the internal battery components. The battery shell may be formed of any corrosion-resistant materials and conforms to BCI$^{SM}$ Battery Group Size requirements.

Figure 5:
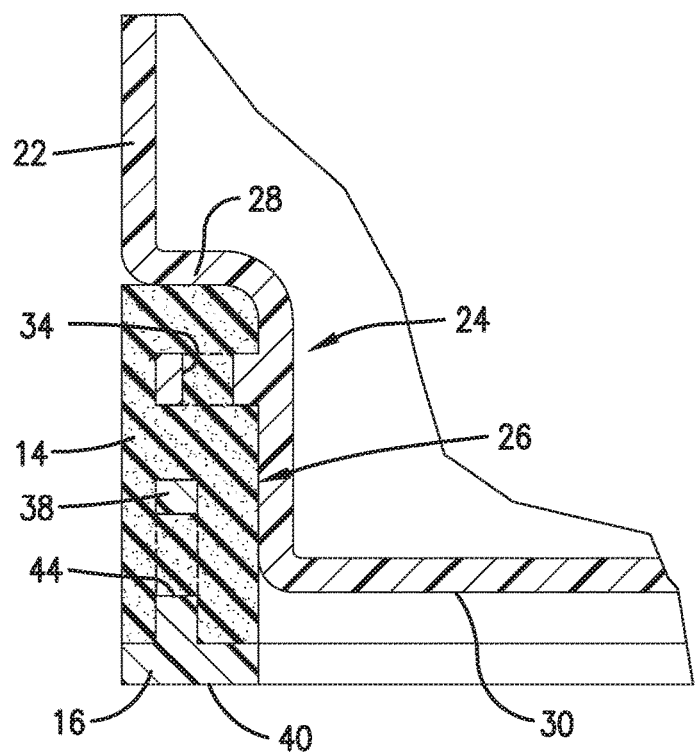
FIG. 5 is a fragmentary cross sectional view of the vehicle battery taken along line 5/5 of FIG. 1.

To accommodate the integrated shock and vibration features of the present invention, the lower walls of the battery shell 12 are stepped-in to define an upper section 22 and a slightly smaller lower section 24 as best shown in FIGS. 4 and 5. The upper section 22 is generally the same length and width as a standard battery, but the lower section 24 has a decreased length and width so as to form a circumscribing channel 26 beneath the upper section, the purpose of which is described below.

A specific embodiment of the upper section 22 includes left, right, front, and rear vertically-extending sidewalls, each connected to an inwardly projecting horizontally-extending ledge 28 as shown in FIGS. 4 and 5. An embodiment of the lower section 24 includes left, right, front, and rear vertically-extending sidewalls, the top edges of which intersect the horizontally-extending ledge 28 at right angles. The lower section 24 also includes a horizontally-extending floor 30 that intersects the lower edges of the side walls at a right angle. The reduced length and width of the lower section 24 as compared to the upper section 22 forms the circumscribing channel 26 beneath the upper section and adjacent the lower section.

In one embodiment, the floor 30 is raised relative to the floors of similar BCI$^{SM}$ batteries such that the battery shell 12 itself is shorter than regularly-sized BCI$^{SM}$ batteries. This allows the shock-absorbing material 14 and the base 16 to be attached to the shell 12 without increasing the overall height of the battery 10 as compared to similar BCI$^{SM}$ batteries.

As best shown in FIG. 4, the battery shell 12 may also include a horizontally-extending flange 32 projecting from the lower section 24. The flange 32 is preferably spaced below the ledge 28, extends radially from the lower section, and includes a number of vertically-extending holes 34, the purposes of which are described below.

Figure 3:
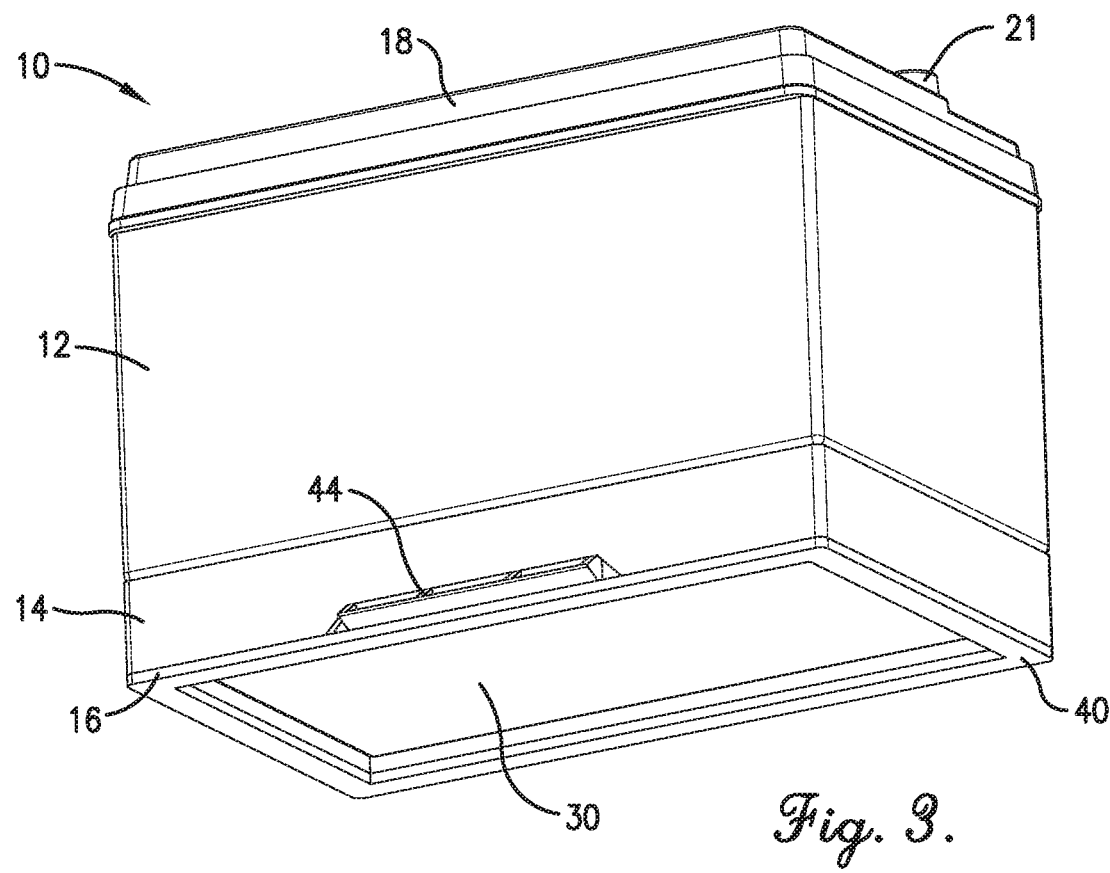
FIG. 3 is a bottom perspective view of the vehicle battery.
Figure 6:
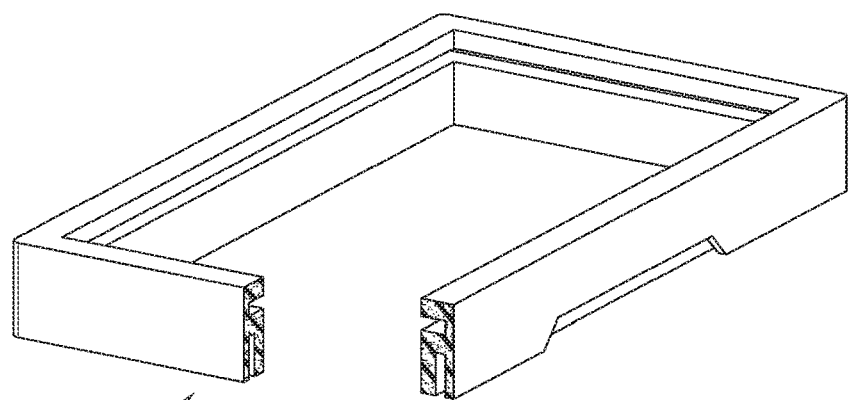
FIG. 6 is a fragmentary perspective view of one embodiment of the shock-absorbing pad of the vehicle battery.

The shock-absorbing pad 14 is attached to the lower section 24 of the battery shell in the channel 26 beneath the upper section 22. An embodiment of the pad 14 is formed of compressible material such as rubber and is frame-shaped as best shown in FIG. 6. In one embodiment, the pad 14 is molded with the battery shell 12 so that the material forming the pad flows through the holes 34 in the ledge 32 to help secure the pad in the channel. In other embodiments, the pad 14 may be formed separately and glued or otherwise attached in the channel 26. As best shown in FIGS. 3 and 5, the lower edge of the pad 14 extends below the floor 30 of the battery shell 12. This isolates the battery shell 12 from the mounting base 16 and the vehicle surface on which it rests as described below.

Figure 7:
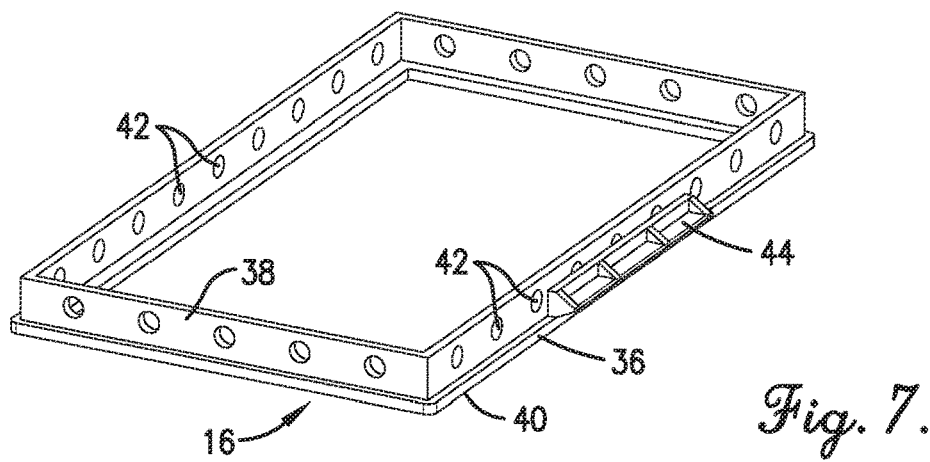
FIG. 7 is a perspective view of one embodiment of the mounting base of the vehicle battery.

The rigid mounting base 16 is attached to the lower edge of the shock-absorbing pad 14 and forms the lowermost portion of the battery 10. The shock-absorbing pad 14 spaces the mounting base 16 from the floor 30 of the battery shell so the battery shell is isolated from the mounting base and the vehicle surface on which it rests. An embodiment of the mounting base 16 is shown in FIG. 7 and includes a lower frame-shaped section 36 and an upper vertically-extending frame-shaped section 38. The underside 40 of the lower section forms a floor that rests on or in a vehicle, the floor of an OE battery holder or other mounting platform. The upper section 38 has a number of horizontally-extending holes 42. In one embodiment, the mounting base 16 is molded with the shock absorbing pad 14 so that the material forming the pad flows through the holes 42 to help secure the mounting base to the pad. In other embodiments, the mounting base 16 may be glued or otherwise attached to the pad 14.

The mounting base 16 also includes hold-down structure 44 best shown in FIGS. 1, 3 and 7 for engaging corresponding hold-down structure in the OE battery holder. In one embodiment, the hold-down structure 44 includes an angled foot extending from at least one side of the mounting base for placement underneath a hold-down flange in an OE battery holder.

In use, the battery 10 may be placed in an OE battery holder such that the floor 40 of the mounting base 16 rests on the floor of the OE battery holder and the hold-down structure 44 is held under corresponding hold down structure in the OE battery holder. The battery shell 12 is isolated from the mounting base 16 and hence the vehicle by the shock-absorbing pad 14 such that no mechanical pathway exists for shocks and/or vibrations to be transmitted from the vehicle to the battery shell and/or battery components housed inside the battery shell. Any shocks or vibrations that are transferred to the mounting base 16 are at least partially mitigated by the pad 14.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed, and substitutions made herein without departing from the scope of the invention as recited in the claims below and other related patent applications.

The invention claimed is:

1. A vehicle battery comprising:
a partially hollow battery shell having an upper section and a stepped-in lower section, the upper section having vertically-extending sidewalls and an inwardly-projecting horizontally-extending ledge, the lower section having vertically-extending sidewalls with top edges that intersect the horizontally-extending ledge at right angles and lower edges, the lower section further having a floor that intersects the lower edges of the sidewalls at right angles, the horizontally-extending ledge of the upper section and the vertically-extending sidewalls of the lower section defining a circumscribing channel beneath the upper section;
a shock-absorbing material attached to the lower section within the circumscribing channel, the shock-absorbing material having a lower edge that extends below the floor of the lower section; and
a mounting base attached to the shock-absorbing material and spaced from the floor of the lower section of the battery shell so the battery shell is elevated and isolated from the mounting base by the shock-absorbing material.

2. The vehicle battery of claim 1, wherein the shock-absorbing material is formed of a compressible material.

3. The vehicle battery of claim 1, wherein the shock-absorbing material is formed of rubber.

4. The vehicle battery of claim 1, wherein the shock-absorbing material is frame-shaped with a hollow center.

5. The vehicle battery of claim 1, further comprising a horizontally-extending flange extending from the sidewall of the lower section of the battery shell.

6. The vehicle battery of claim 5, wherein the horizontally-extending flange includes a number of vertically-extending holes.

7. The vehicle battery of claim 6, wherein the shock-absorbing material is formed from moldable material that flows through the vertically-extending holes in the horizontally-extending flange to help secure the shock-absorbing material to the battery shell.

8. The vehicle battery of claim 1, wherein the mounting base includes a lower section and an upper section, the upper section includes a number of horizontally-extending holes.

9. The vehicle battery of claim 8, wherein the shock-absorbing material is formed from moldable material that flows through the horizontally-extending holes in the upper section of the mounting base to help secure the mounting base to the shock-absorbing material.

10. The vehicle battery of claim 1, wherein the mounting base includes integral hold-down structure for engaging corresponding hold-down structure in a vehicle battery holder.

11. The vehicle battery of claim 10, wherein the hold-down structure of the mounting base includes an angled foot for placement underneath a hold-down flange in the vehicle battery holder.

12. A vehicle battery comprising:
a partially hollow battery shell having an upper section and a stepped-in lower section, the upper section having vertically-extending sidewalls and an inwardly-projecting horizontally-extending ledge, the lower section having vertically-extending sidewalls with top edges that intersect the horizontally-extending ledge at right angles and lower edges, the lower section further having a floor that intersects the lower edges of the sidewalls at right angles, the horizontally-extending ledge of the upper section and the vertically-extending sidewalls of the lower section defining a circumscribing channel beneath the upper section;

a horizontally-extending flange extending from the sidewall of the lower section of the battery shell;

shock-absorbing material attached to the lower section of the battery shell within the circumscribing channel via the horizontally-extending flange, the shock-absorbing material formed of compressible material and having a lower edge that extends below the floor of the lower section and an upper edge that directly contacts the horizontally-extending ledge of the upper section; and a mounting base attached to the shock-absorbing material and spaced from the floor of the lower section of the battery shell so the battery shell has no connection with the mounting base other than the shock-absorbing material so the battery shell is mechanically isolated from the mounting base and a corresponding vehicle surface on which the mounting base rests.

13. The vehicle battery of claim 12, wherein the shock-absorbing material is formed of rubber.

14. The vehicle battery of claim 12, wherein the shock-absorbing material is frame-shaped with a hollow center.

15. The vehicle battery of claim 12, wherein the horizontally-extending flange includes a number of vertically-extending holes.

16. The vehicle battery of claim 15, wherein the shock-absorbing material is formed from moldable material that flows through the vertically-extending holes in the horizontally-extending flange to help secure the shock-absorbing material to the battery shell.

17. The vehicle battery of claim 12, wherein the mounting base includes a lower section and an upper section, the upper section includes a number of horizontally-extending holes.

18. The vehicle battery of claim 17, wherein the shock-absorbing material is formed from moldable material that flows through the horizontally-extending holes in the upper section of the mounting base to help secure the mounting base to the shock-absorbing material.

19. The vehicle battery of claim 12, wherein the mounting base includes an integral angled front for engaging corresponding hold-down structure in a vehicle battery holder.

20. A vehicle battery comprising:
a partially hollow battery shell having an upper section and a lower section, the upper section having vertically-extending sidewalls and an inwardly-projecting horizontally-extending ledge, the lower section having vertically-extending sidewalls with top edges that intersect the horizontally-extending ledge at right angles and lower edges, the lower section further having a floor that intersects the lower edges of the sidewalls at right angles, the horizontally-extending ledge of the upper section and the vertically-extending sidewalls of the lower section defining a circumscribing channel beneath the upper section;

a mounting base for supporting the vehicle battery on a surface, the mounting base having no physical connection to the battery shell; and shock-absorbing material positioned within the circumscribing channel at least partially between the lower section of the battery shell and the mounting base to isolate the battery shell from the mounting base and the surface on which it rests.

\* \* \* \* \*